US008161680B1

(12) United States Patent
Sloan et al.

(10) Patent No.: US 8,161,680 B1
(45) Date of Patent: Apr. 24, 2012

(54) COLLAPSIBLE SUMMER AND WINTER PLANT PROTECTOR

(76) Inventors: Russell Sloan, Jacksonville Beach, FL (US); Kim Matthews, Jacksonville Beach, FL (US)

( * ) Notice: Subject to any disclaimer, the term of this patent is extended or adjusted under 35 U.S.C. 154(b) by 153 days.

(21) Appl. No.: 12/818,217

(22) Filed: Jun. 18, 2010

(51) Int. Cl.
*A01G 13/02* (2006.01)

(52) U.S. Cl. ......................................................... 47/29.6

(58) Field of Classification Search ................... 47/20.1, 47/22.1, 23.1, 29.1, 29.5, 29.6, 31, 31.1
See application file for complete search history.

(56) References Cited

U.S. PATENT DOCUMENTS

| 415,638 | A | | 11/1889 | Hawks | |
|---|---|---|---|---|---|
| 935,691 | A | * | 10/1909 | Rozendal | 47/29.6 |
| 1,683,043 | A | * | 9/1928 | Miller | 47/29.6 |
| 4,062,370 | A | * | 12/1977 | Brickner et al. | 135/34.2 |
| 6,014,837 | A | | 1/2000 | Morgan | |
| 6,088,952 | A | | 7/2000 | Wilson | |
| 6,088,953 | A | * | 7/2000 | Morgan | 47/31 |
| 7,497,048 | B2 | * | 3/2009 | Bakowski | 47/31 |
| 8,079,176 | B1 | * | 12/2011 | Thead et al. | 47/29.6 |

* cited by examiner

*Primary Examiner* — Monica Williams
(74) *Attorney, Agent, or Firm* — Lawrence J. Gibney, Jr.

(57) ABSTRACT

The current device will enable the plant owner to protect a plant during the winter months from the extreme cold and at the same time protect the plant from birds and insects during the summer months. This device can be easily opened to cover the plant and can also be easily collapsed when it is no longer needed. At least two different types of material can be used: one of colder weather and one for warmer weather. Different choices of material may be used depending on the particular environment. The device will be lightweight and extremely portable.

4 Claims, 5 Drawing Sheets

COLLAPSIBLE SUMMER AND WINTER PLANT PROTECTOR

BACKGROUND OF THE INVENTION

A. Field of the Invention

This relates to protecting plants from temperature extremes during winter and during summer from birds, insects and other pests. This device will be a protective covering that can be easily collapsed and stored and can be easily taken off and put over plants.

B. Prior Art

There are other prior art references to plant protectors in general, and a representative example of this type of device can be found at Hawks, U.S. Pat. No. 415,638 which is a protective covering. Hawks, however, is a teepee type frame that is placed over the plant but is not secured in the ground, nor is it collapsible although it can be folded. From the drawings it appears to only protect a portion of the plant and does not adequately protect the root ball of the plant.

Another adaptable plant protector can be found at Morgan, U.S. Pat. No. 6,014,837, which is a device that can be placed over the plant in different configurations. This can be inserted into the ground but does not wrap around the plant or completely cover all portions of the plant and therefore, does not protect all surfaces of a plant.

BRIEF SUMMARY OF THE INVENTION

This is a device that can be placed over a plant and insures the plant stays protected during the winter months by preserving heat or containing heat within a certain area. During the winter it is imperative to protect the root ball of the plant to prevent the plant from dying. The root ball is located just below the surface level. Depending on the geographic area, the winter can be relatively long and harsh or short and mild. This device will enable the plant owner to protect the plant without needing to constantly monitor the condition of the ground.

The same device will also be able to protect the plant during the summer months by incorporating a different material so that the plant can be ventilated during the summer months as well as providing a protective barrier against birds, insects and other pests. Again the summer can be long and harsh or relatively short and mild. Under both sets of conditions this device will protect the plant regardless of the length or type of summer.

The device will be arranged in different sizes to accommodate different sized plants and is collapsible for easy storage. It will also be made from a variety of different materials.

A means to anchor the device into the ground will be incorporated into the device so that heat is contained in order to protect the root ball of the plant during winter. This may be a plurality of tapered spikes that may be pushed into the ground. The attachment point for the frame of the device will be placed on one side of the tapered spike to form a ledge by which the person can push the stake into the ground using his or her foot or hand.

Additionally a drawstring on the bottom of the cover material will allow the cover material to be tied around the bottom portion of the plant if desired.

A frame that is relatively sturdy and semi-rigid is comprised of mechanical linkage that is configured to allow the device to open and close with relative ease using either a drawstring or semi-rigid pole threaded through a grommet. Once the drawstring or pole is threaded through the grommet, the frame can be locked in place. Conversely the device can be easily collapsed once the device is no longer needed to cover the plant.

DETAILED DESCRIPTION OF THE EMBODIMENTS

This device 5 will be used to cover plants during the winter and/or summer months. Different choices of material will be made, depending on the season involved.

In the winter months the root ball of the plant that lies just below the surface of the ground must be protected from freezing. In the summer months the problems that most frequently arise are birds and insects that will attack the outer structure of the plant.

Figure 1:
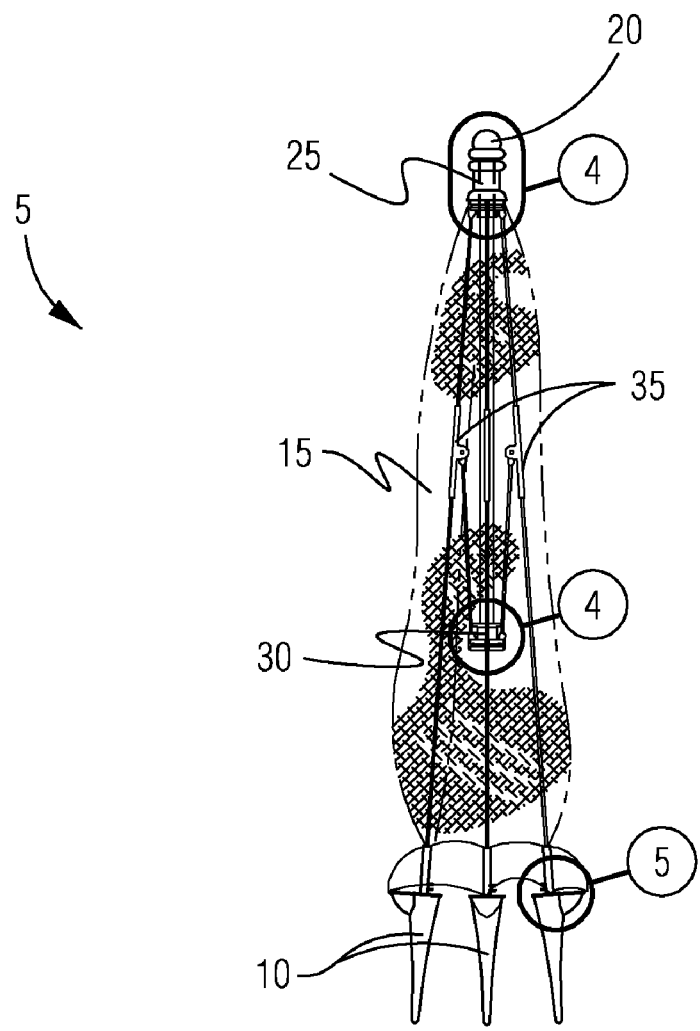
FIG. 1 is a front view of the device in collapsed form.
Figure 2:
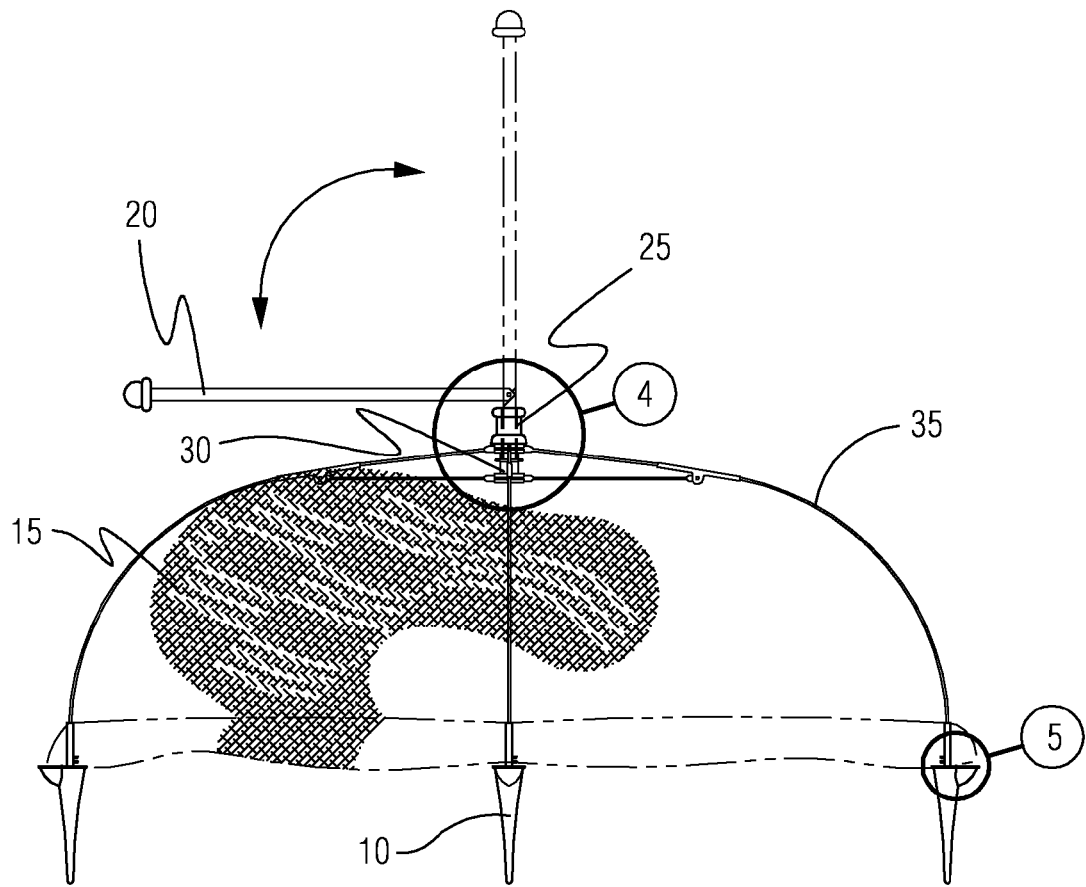
FIG. 2 is a side view of the device opened.

Obviously, in the winter months, the material will allow the plant to breathe but will also protect the root ball of the plant while at the same time conserve heat to protect the plant against harsh temperature extremes. The device can be anchored in the ground using a means to anchor such as plurality of tapered spikes 10 such as depicted in FIGS. 1 and 2. This will allow the device to cover the entire plant to the surface level and therefore protect the root ball of the plant.

Additionally a drawstring (not depicted) may be incorporated along the bottom edge of the perimeter of the cover material if is it determined that the material of this device should be wrapped around the plant structure as opposed to having a more open configuration using the anchoring means 10.

The spikes 10 are attached to one end of the frame member 35 and different types of means to secure the device to the ground may be used. As depicted in FIGS. 1 and 2 tapered spikes are used to anchor the device into the ground. The tapered spike 10 will be secured to the frame member 35 and a portion of the top surface of the spike will be offset to form a ledge or platform 40. When the device is to be anchored into the ground, the person places his or her foot or hand on the platform 40 and drives the anchoring means into the ground.

Whatever means is used to anchor the device, consideration should be made that this device will be exposed to sometimes harsh conditions and it should be relatively easy to install or remove the device when it is no longer needed.

During the summer period, lightweight material will protect the plant against insects that may destroy plants, but it will also allow the plant to breathe. It is not as important to protect the root ball in the summer but it is imperative to protect the plant from birds and insects attacking the outside structure of the plant.

The device 5 will be available in many different shapes and configurations. It will be closed and opened, using mechanical linkage 35, which is attached by links in a predetermined fashion to both a flanged member 30 and a means to open the frame such as by use of a rod 20 or a drawstring. Attached to the sides of the flanged member 30 will be a portion of the frame structure that will permit the opening of the device in order to cover a plant.

As the rod 20 moves through a grommet 25, the device will expand to eventually resemble what is depicted in FIG. 2. The material 15 will be attached to the frame of the device so that when it is opened the fabric will provide a covering for the plant. The rod 25 is hinged so that it will bend. Although a rod is depicted a drawstring may also be used or some other means to bring the flanged member 30 into position to lock the device in place.

Figure 3:
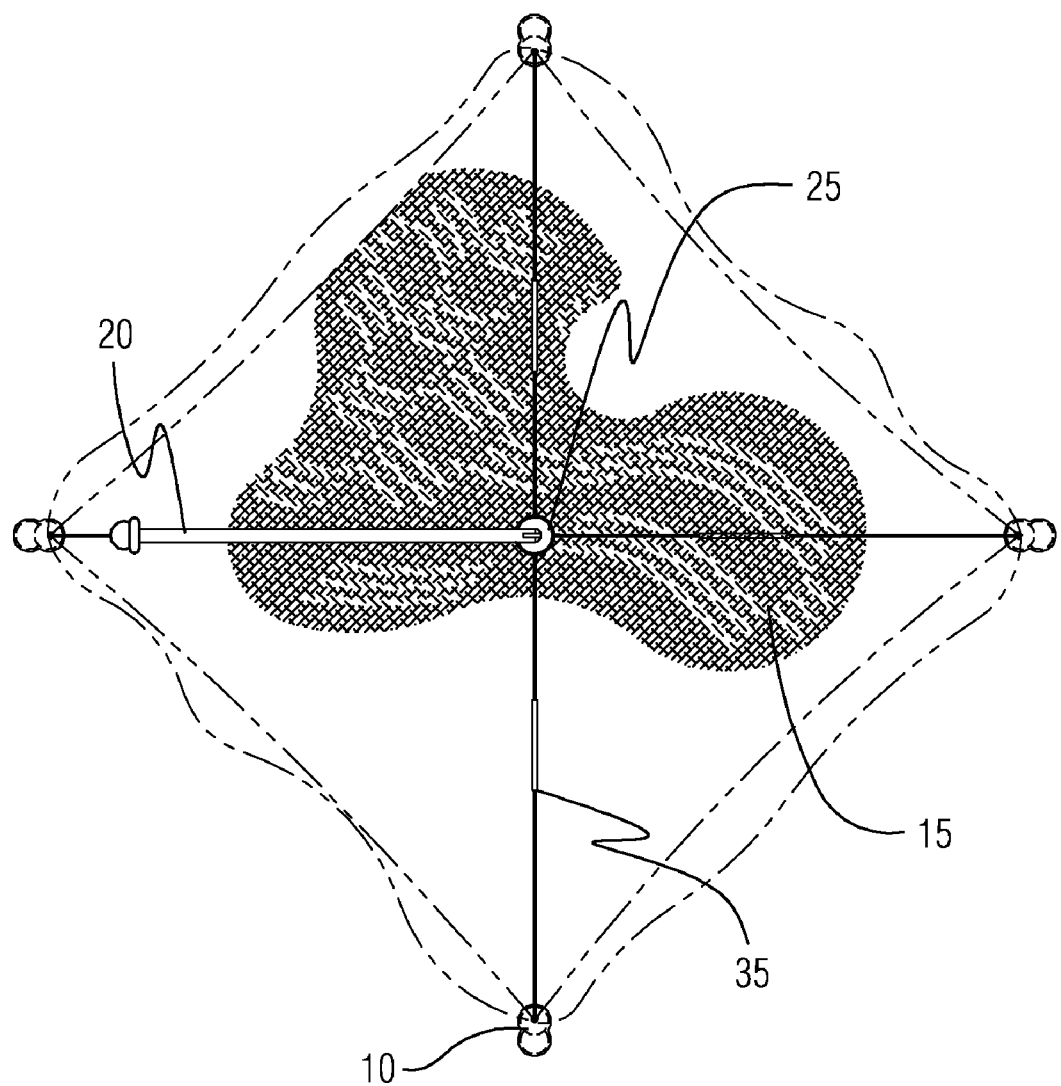
FIG. 3 is a top view of the device as it is open over a plant.

When the flanged member 30 is at a predetermined point the flanged member is capable of being locked into position so that the device can retain its shape over the plant such as depicted in FIG. 3. There are many means to lock the flange in place and no particular means is claimed.

When the device is fully deployed the rod 20 is hinged and can be bent approximately ninety degrees to maintain tension on the flanged member 30. In its fully deployed position such as depicted in FIG. 2 the material 15 will provide a covering for the plant. An attachment point on the frame 36 near the spike will be provided to attach the material 15 to the frame structure 35.

Figure 4:
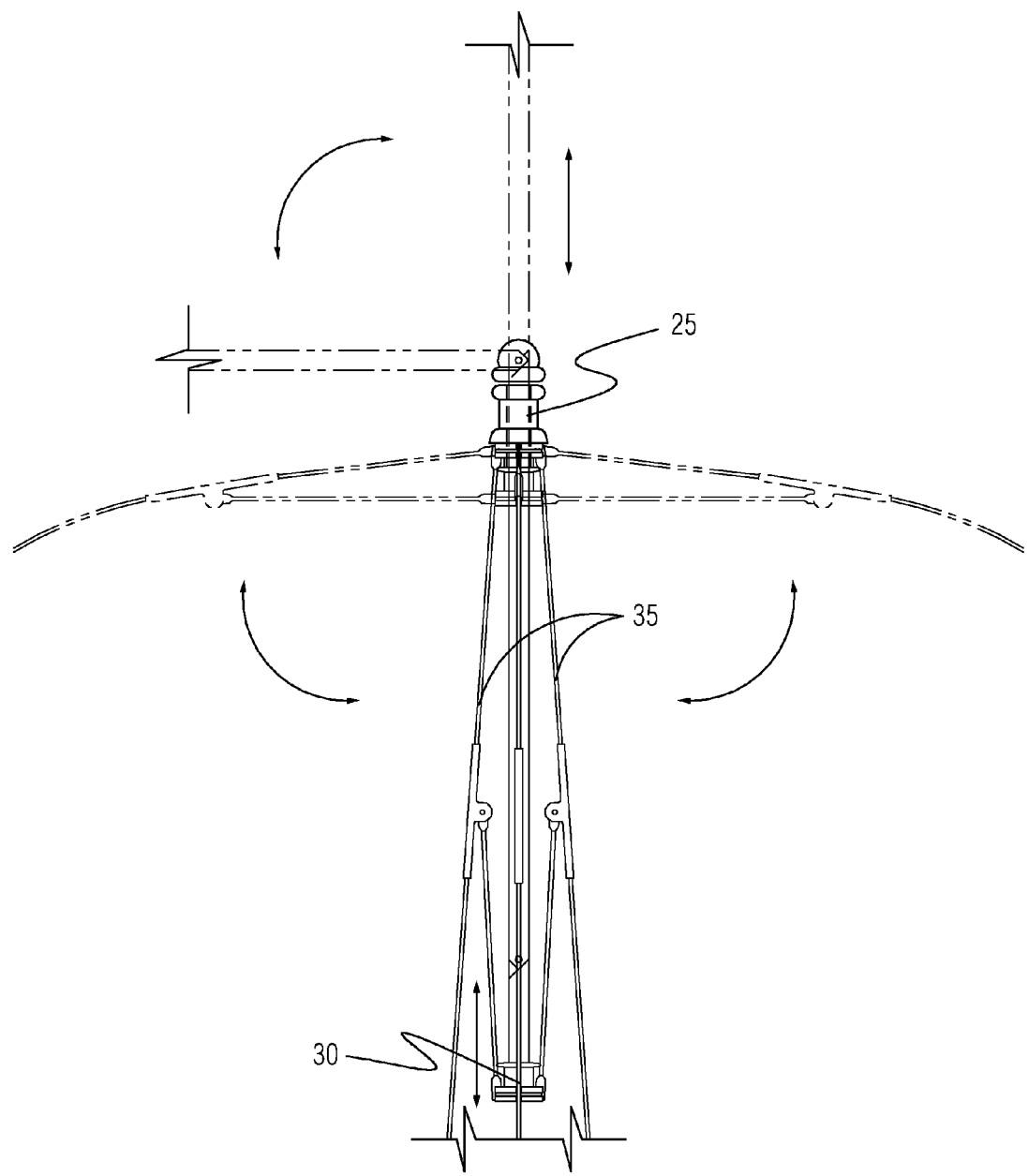
FIG. 4 is a partially fragmented view of sections labeled number 4 on FIGS. 1 and 2.
Figure 5:
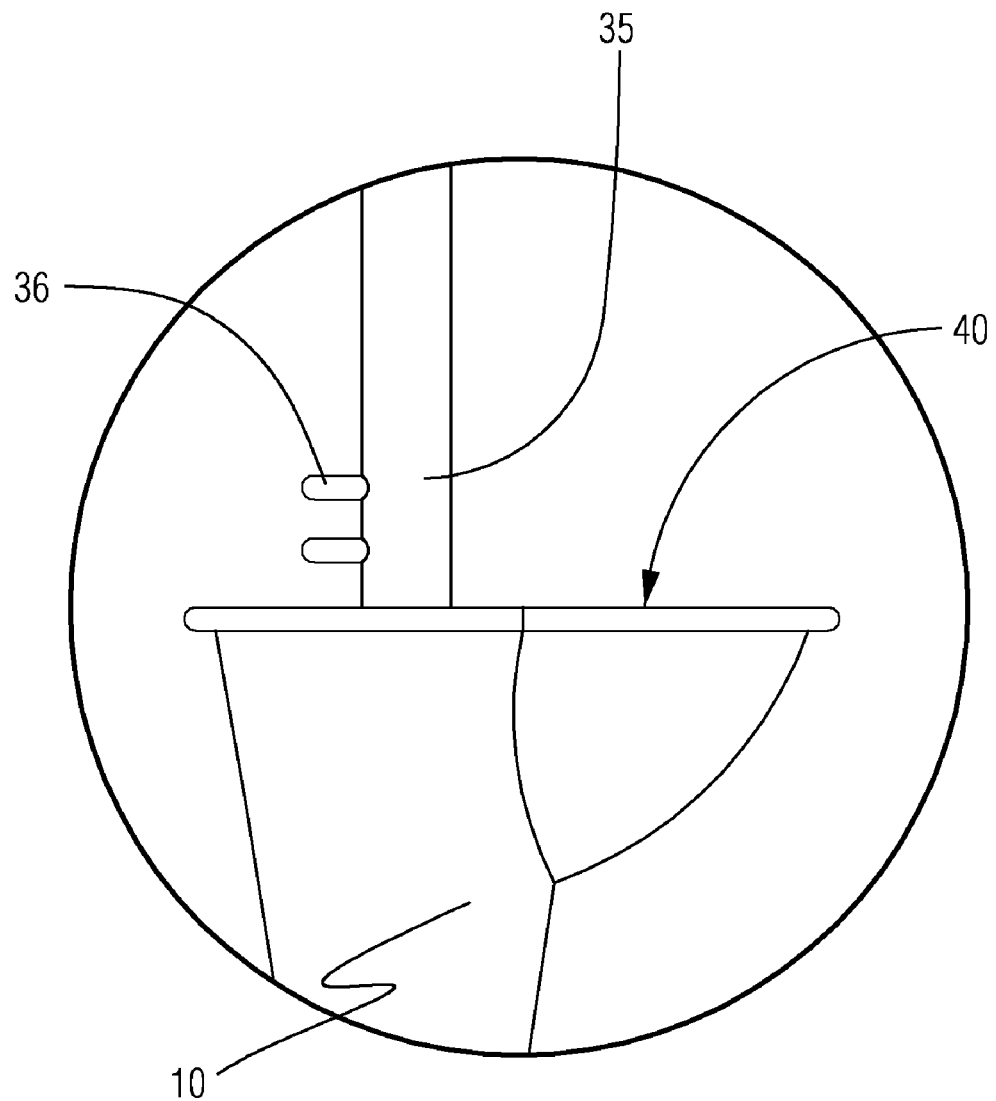
FIG. 5 is a fragmented view of the anchoring device.

In its collapsed form such as depicted in FIG. 4 the mechanical linkage 35 will fold to form the device in its folded state. The rod 20 will rotate and be threaded through the grommet 25 and push the flange mechanism 30 downward to collapse the device.

While the embodiments of the invention have been disclosed, certain modifications may be made by those skilled in the art to modify the invention without departing from the spirit of the invention.

The inventors claim:

1. A collapsible summer and winter plant protector, which is comprised of:
    a. a frame of predetermined dimensions; wherein mechanical linkage is provided;
    said mechanical linkage forms the frame; wherein the frame is collapsible by folding said mechanical linkage; said mechanical linkage comprising a plurality of arms;
    b. cover material; wherein said cover material is placed over the frame; said cover material is secured to the frame; wherein a drawstring is provided on a bottom perimeter of the cover material to allow the cover material to be tied around the bottom portion of a plant;
    c. flanged member; wherein said flanged member is connected to the mechanical linkage; wherein the flanged member is capable of being locked into position so that the device can retain an open configuration over a plant;
    d. a grommet; wherein said grommet is provided in the frame;
    e. a means to open; wherein said means to open is attached to the flanged member; wherein said means to open comprises a rod which is threaded through said grommet to expand said frame to form the open configuration;
    f. a means to anchor; wherein said means to anchor the device to the ground is attached to one end of the frame member; wherein said means to anchor comprises a plurality of tapered spikes attached to an end portion of each of said plurality of arms.

2. The collapsible summer and winter plant protector as described in claim 1, wherein said plurality of tapered spikes further comprise a platform on the top surface of each tapered spike.

3. A means to use the collapsible summer and winter plant protector as described in claim 1 which is comprised of the following steps:
    a. selecting the choice of cover material;
    b. pulling the means to open through the grommet of the frame;
    c. locking the flanged member in place;
    d. placing the device over the plant;
    e. inserting the means to anchor into the ground.

4. A means to use the collapsible summer and winter plant protector as described in claim 1 which is comprised of the following steps:
    a. selecting the choice of cover material;
    b. placing the cover material over the frame of the device;
    c. pulling the means to open through the grommet of the frame;
    d. locking the flanged member in place;
    e. placing the device over the plant;
    f. pulling the drawstring of the device to form the material closely to the plant structure.

\* \* \* \* \*